UNITED STATES PATENT OFFICE.

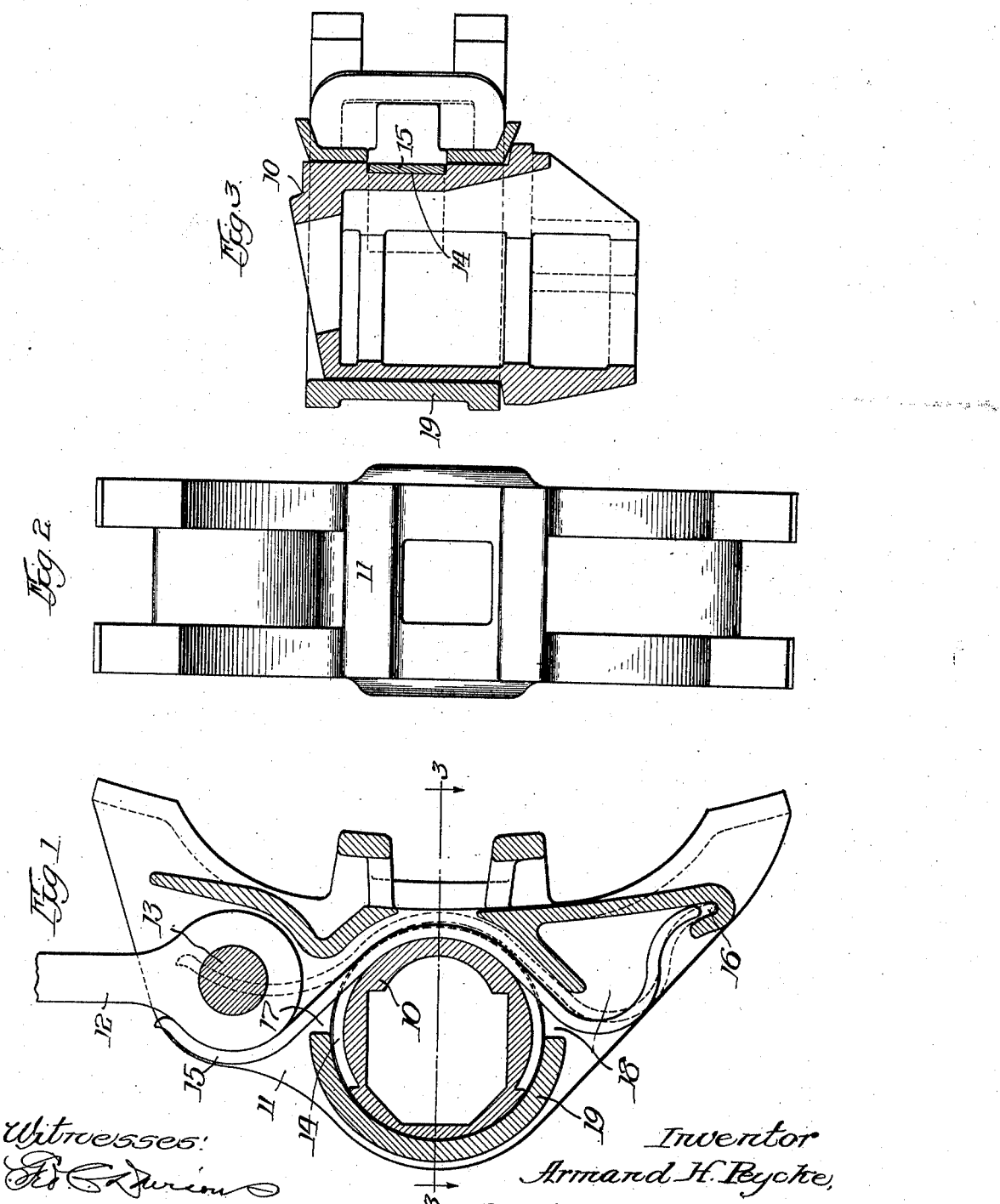

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

ADJUSTABLE BRAKE-HEAD.

1,315,399.  Specification of Letters Patent.  Patented Sept. 9, 1919.

Application filed February 13, 1918. Serial No. 217,007.

*To all whom it may concern:*

Be it known that I, ARMAND H. PEYCKE, a citizen of the United States, and resident of Chicago, in the county of Cook and State of Illinois, have invented certain new and useful Improvements in Adjustable Brake-Heads, of which the following is a specification.

This invention relates to adjustable brake heads.

The object of this invention is to improve and simplify means whereby a brake head may be held yieldably in any given position and may be releasably locked to an associated member.

Generally speaking, this and other objects are accomplished by providing, in a brake mechanism, the combination of a brake head, an associated member, and pressure means for locking together the brake head and member.

The invention is illustrated on the accompanying sheet of drawings, in which—

Figure 1 is a vertical sectional view of brake mechanism, including a brake beam, head and hanger, embodying my invention;

Fig. 2 is a front elevation of the brake head; and,

Fig. 3 is a sectional view taken in the plane of line 3—3 of Fig. 1.

The various novel features of my invention will be apparent from the following description and drawings and will be particularly pointed out in the appended claims.

In this particular case I have provided an arrangement whereby the brake head not only is permitted to adjust itself in accordance with working conditions, but also is releasably locked to its associated brake beam by a pressure element, which coöperates to control the automatic adjustment of the brake head on its beam.

Referring particularly to the figures of the drawings, it will be noted that I have disclosed brake mechanism including a brake beam having a trunnion 10 for the reception of a brake head 11, the latter in this case being pivotally connected to a hanger 12 by means of a pin 13. The brake beam trunnion 10 preferably is provided with a groove 14 extending circumferentially around a portion of the trunnion. In order to frictionally hold the brake head 11 in adjusted position with respect to the brake beam trunnion 10, I have provided pressure means which, in this case, takes the form of a resilient member or spring 15, the intermediate curved portion of which is received by the trunnion groove 14. The lower end of the spring is retained in a lipped recess 16, formed in the rear of the front wall of the brake head. The other or upper end of the spring is associated with the bearing portion of the hanger 12.

In assembling the parts, the spring 15 is passed into the head from the upper part thereof through openings 17 and 18 formed in the trunnion bearing 19 of the head, the lower end of the spring being placed in the lipped recess 16 and assuming the position indicated by dotted lines in Fig. 1. With the spring in this position the brake head is applied to the brake beam trunnion in a manner such that the spring 15 is brought opposite the trunnion groove 14, after which the hanger 12 is pressed downwardly between the upper end of the spring 15 and the front wall of the brake head, thereby forcing the upper end of the spring rearwardly and causing the intermediate portion of the spring to pass into the trunnion groove 14 and engage the trunnion with the requisite amount of pressure. The pin 13 is then set in place for connecting the hanger 12 and brake head 11.

From this arrangement it is apparent that the brake head not only is adjustably held in place in accordance with braking conditions to maintain the brake shoes in a concentric relationship with the tread of the associated wheel, but also the brake head is releasably locked to the brake beam by the interaction of the spring 15 and the trunnion groove 14. It is impossible for the brake head to be withdrawn accidentally or otherwise unless the spring 15 is permitted to pass out of the trunnion groove 14, which, of course, necessitates the removal of the hanger 12.

There may be various modifications of the invention and it is my intention to cover all modifications falling within the spirit and scope of the following claims.

I claim:

1. In brake mechanism, the combination of a brake beam having a groove, a brake head mounted on said beam, a hanger connected to said brake head, and resilient means bearing on the head, hanger and beam and engaging said groove for locking the head on said beam.

2. In brake mechanism, the combination of a brake beam having a trunnion, a brake head mounted thereon, a spring for adjustably holding the head on said trunnion, and a hanger connected to said head and engageable with said spring by which engagement the holding tension of said spring is changed.

3. In brake mechanism, the combination of a brake beam having a trunnion, a brake head mounted on said trunnion, a hanger connected to said brake head, and a spring carried by said brake head and clamped into frictional engagement with said trunnion by action of said hanger.

4. In brake mechanism, the combination of a brake beam having a trunnion with a groove therein, a brake head mounted on said trunnion, a spring carried by said head, and a hanger connected to said brake head for pressing said spring into said groove for locking the head on said trunnion.

Signed at Chicago, Illinois, this 31st day of January, A. D., 1918.

ARMAND H. PEYCKE.

Witnesses:
B. C. BRIGHAM,
C. M. OBERBECK.

Copies of this patent may be obtained for five cents each, by addressing the "Commissioner of Patents, Washington, D. C."